United States Patent
Jones

(10) Patent No.: US 7,290,392 B2
(45) Date of Patent: Nov. 6, 2007

(54) WASTEGATE ACTUATOR MOUNTING BRACKET, TURBOCHARGER INCORPORATING THE BRACKET, AND METHOD OF USING SAME

(75) Inventor: Gregg Jones, Owosso, MI (US)

(73) Assignee: TiA1 Products, Inc., Owosso, MI (US)

( * ) Notice: Subject to any disclaimer, the term of this patent is extended or adjusted under 35 U.S.C. 154(b) by 45 days.

(21) Appl. No.: 11/162,301

(22) Filed: Sep. 6, 2005

(65) Prior Publication Data
US 2007/0051106 A1  Mar. 8, 2007

(51) Int. Cl.
F02D 23/00 (2006.01)
F16L 23/00 (2006.01)
F16L 17/00 (2006.01)
F16L 19/00 (2006.01)
F16L 21/02 (2006.01)
F16L 41/00 (2006.01)
F16L 5/00 (2006.01)
A47G 1/10 (2006.01)

(52) U.S. Cl. .................. 60/602; 285/364; 285/197; 285/49; 248/316.5

(58) Field of Classification Search ............. 60/602; 248/674, 213.2, 213.4, 229.13, 226.12, 315, 248/316.5; 285/364, 197, 49; 24/19, 284
See application file for complete search history.

(56) References Cited

U.S. PATENT DOCUMENTS

| | | | |
|---|---|---|---|
| 2,937,893 A | 5/1960 | Hill et al. .................. 285/238 |
| 3,022,561 A * | 2/1962 | Jagiel ........................ 24/284 |
| 3,026,815 A * | 3/1962 | Jacobs ......................... 285/49 |
| 4,059,045 A | 11/1977 | McClain | |
| 4,492,519 A * | 1/1985 | Owen et al. ................. 60/602 |
| 4,558,891 A | 12/1985 | Wagner et al. .............. 285/322 |
| 4,563,795 A * | 1/1986 | Fournier ...................... 24/19 |
| 4,655,043 A * | 4/1987 | McInerney ................... 60/602 |
| 4,894,990 A * | 1/1990 | Tsubouchi ................... 60/602 |
| 5,199,260 A | 4/1993 | Iwick ......................... 60/602 |
| 5,344,112 A * | 9/1994 | Peterson et al. ......... 248/316.5 |
| 5,746,058 A * | 5/1998 | Vertanen ..................... 60/602 |
| 6,003,548 A * | 12/1999 | Muchow .................... 285/364 |
| 6,234,541 B1 * | 5/2001 | Wagner et al. .............. 285/197 |
| 6,402,119 B1 | 6/2002 | Miska | |
| 6,658,846 B1 | 12/2003 | McEwan .................... 60/602 |
| 6,896,301 B2 * | 5/2005 | Brice ......................... 285/364 |

* cited by examiner

Primary Examiner—Thai-Ba Trieu
(74) Attorney, Agent, or Firm—Carrier, Blackman & Associates, P.C.; Joseph P. Carrier; William D. Blackman

(57) ABSTRACT

A mounting bracket adapted for use in mounting a wastegate actuator to a turbocharger of an automotive engine. The mounting bracket includes a flat metal bracket having a hole formed therein, for supporting the wastegate actuator, and a clamping portion integrally attached to the metal bracket. The clamping portion surrounds a cylindrical inlet portion of the turbocharger to mount the bracket thereon. The clamping portion is also used to tighten the wastegate actuator in place on the turbocharger body. Once a desired position of wastegate actuator is achieved, the clamping portion is tightened around the turbocharger pipe using a fastener to keep the two halves of the clamping portion fastened together. The design of the mounting bracket allows for a large number of positions in which the wastegate actuator is placed on the turbocharger.

14 Claims, 5 Drawing Sheets

PRIOR ART

WASTEGATE ACTUATOR MOUNTING BRACKET, TURBOCHARGER INCORPORATING THE BRACKET, AND METHOD OF USING SAME

BACKGROUND OF THE INVENTION

1. Field of the Invention

The present invention relates to turbocharged engines and related hardware. More particularly, the present invention relates to a clamping bracket for use in mounting a wastegate actuator to a turbocharger, and to a method of using the bracket. Even more particularly, the present invention relates to a mounting method and to a clamping bracket for mounting a wastegate actuator to a turbocharger assembly which provides improved adjustability in positioning the wastegate actuator on the turbocharger.

2. Description of the Background Art

Turbochargers, powered by high pressure exhaust gases produced by internal combustion engines, are widely used in automotive vehicles to supply pressurized intake air to the vehicle's combustion chamber, to yield increased engine power. A typical turbocharger normally includes a turbine housing and a compressor housing constructed side by side. The turbine housing contains an exhaust gas-driven turbine wheel mounted on a rotatable shaft, and the compressor housing contains a compressor wheel mounted on the other end of the same rotatable shaft, for concurrent rotation with the turbine wheel.

Turbochargers are also typically equipped with a wastegate, disposed in a passageway between the exhaust gas inlet and outlet portions of the turbine housing, to allow the flow of exhaust gas to bypass the turbine wheel as needed. The wastegate is opened, for example, when the intake manifold pressure exceeds a preset value, sometimes referred as a lift off pressure.

The wastegate includes four components, namely, an inlet portion, an outlet portion, a wastegate actuator and a wastegate valve.

The wastegate actuator generally includes a spring loaded diaphragm, housed within an actuator canister, and an actuator rod for actuating the spring loaded diaphragm. The wastegate actuator is mounted on the compressor housing of the turbocharger. The actuator canister is connected to the compressor portion of the turbocharger, through a sensing hose, to provide air pressure to the diaphragm. The diaphragm, which is controlled by intake manifold pressure, acts on the actuator rod for activating the wastegate valve which is mounted on the turbine housing of the turbocharger.

A wastegate valve is disposed in a passageway between the inlet portion and the outlet portion of the wastegate. The wastegate valve is normally closed in a default position, and held closed by the diaphragm spring housed inside the actuator canister. When the air pressure level of the intake manifold exceeds the preset value, the wastegate valve progressively opens the passageway, allowing some exhaust gas to bypass the turbine wheel of the turbocharger.

The diaphragm spring is selected or the length of the actuator rod is adjusted such that the wastegate valve remains in closed position up to a preset air pressure, and when the air pressure of the intake manifold exceeds the preset level, the actuator rod moves against the action of spring and opens the wastegate valve.

There has been an ongoing trend in engine compartment design, in recent years, to pack components tightly together under the hood. It will be appreciated that the different engine compartments, of different automotive vehicles, have different amounts of space available for mounting a turbocharger. Therefore, it is important to accommodate the turbocharger within the available space, oriented in a position to achieve effective performance of the turbocharger, and to achieve higher efficiency of the automotive engine.

In previous designs of mounting brackets for wastegate actuator, the wastegate actuator is mounted using a fixed bolt pattern, generally formed on the compressor housing, which severely limits the indexing possibilities of the wastegate actuator. See, e.g., FIGS. 5 and 6.

There are a few clamping and mounting devices used in automotive vehicles as illustrated in the U.S. Pat. Nos. 2,937,893 (Hill et al), 4,558,891 (Wagner et al), 4,059,045 (McClain), 5,199,260 (Iwick), 6,402,119 (Miska), and 6,658,846 (McEwan).

Hill et al., U.S. Pat. No. 2,937,893, issued in 1960 and entitled "Resealable Conduit Coupling with Abutting Resilient Flange Surfaces", discloses a band-type conduit coupling for connecting two pipe sections together. The conduit coupling includes a band which wraps around the pipes to be joined, and the band is tightened by spinning a nut on a threaded shaft provided at one end of the band.

Wagner et al., U.S. Pat. No. 4,558,891, issued in 1985 and entitled "Clamp for Exhaust System", discloses a band clamp for securing overlapping telescoped adjacent tubes in an exhaust system of automotive vehicle to form a substantially leak-proof joint. The band clamp includes a circular band and a bolt having a curved end secured thereto over a predetermined circumferential distance adjacent one end of the band and a straight threaded end extending through an extension secured adjacent to the opposite end of the band. A nut is provided on the straight threaded end of the bolt for tightening against the extension to draw the ends of the band together in near abutting relationship to engage the lap joint over a substantially continuous circumferential area. The extension either can bridge the gap to serve as a guide for the outer end of the band, or it can be an integral portion of the band.

McClain, U.S. Pat. No. 4,059,045, issued in 1977 and entitled "Engine Exhaust Rain Cap with Extruded Bearing Support Means", discloses a circular metal band for mounting a rain cap mechanism to a circular exhaust pipe of a heavy duty vehicle.

Miska, U.S. Pat. No. 6,402,119, issued in 2002 and entitled "Textile-Reinforced Rubber Exhaust System Hanger", discloses a hanging bracket assembly, for a muffler system of an automotive vehicle, which includes a plurality of the brackets on the vehicle frame that serve as mounting points for mounting for an exhaust pipe which has a plurality of circular clamps attached thereto at points corresponding to the brackets. Each clamp has a clamp pin integrally attached thereon that protrudes in the same direction as the pin of its corresponding bracket.

Iwick, U.S. Pat. No. 5,199,260, issued in 1993 and entitled "Wastegate Actuator Valve for a Turbocharger", discloses a wastegate control valve for a turbocharger. McEwan, U.S. Pat. No. 6,658,846, issued in 2003 and entitled "Turbocharger With Wastegate", discloses a turbocharger having an actuating rod which controls the wastegate. The disclosures of these U.S. Pat. Nos. 5,199,260 and 6,658,846, do not specifically discuss how the wastegate actuator is attached to the turbocharger, however, it appears that the wastegate actuator is attached to the turbocharger via bolts, which are positioned in a preset fixed bolt pattern on the turbocharger, which do not permit positioning of wastegate actuator on the turbocharger as desired.

However, none of the existing clamping devices or brackets are suitable for mounting the wastegate actuator on the turbocharger, in a manner that would permit a large range of positions at which the wastegate actuator could be mounted on the turbocharger. Increased turbocharger efficiency and increased engine power can be derived by properly positioning the wastegate actuator on the compressor housing of the turbocharger.

Therefore, a need exists in the art for an improved mounting bracket for orienting a wastegate actuator on a turbocharger body. More particularly, there is a need for a wastegate actuator mounting bracket which permits a large number of positioning possibilities to overcome the limitations encountered with the known art.

SUMMARY OF THE INVENTION

Accordingly, it is an object of the present invention to provide a simple and versatile clamping device for mounting a wastegate actuator to a turbocharger body, that permits a large number of possibilities for positioning the wastegate actuator on the turbocharger. Such flexibility in positioning the wastegate actuator promotes fitting the components into the space available, as well as achieving increased efficiency and proper functioning of the turbocharger and automotive engine.

The present invention provides a wastegate actuator mounting bracket including a flat metal bracket plate which has a hole formed therein for supporting a wastegate actuator cylinder. The opening in the bracket plate may be a circular opening. The mounting bracket apparatus also includes a clamping portion integrally attached to the flat metal bracket plate, for placement surrounding a cylindrical inlet portion of the turbocharger compressor housing, to permit mounting of the bracket apparatus thereon. The clamping portion includes a pair of semi-circular halves. One end of the each of the halves is integrally attached to the flat plate, and the other end includes a flange provided thereon. Each of the flanges includes an opening formed therein for receiving a fastener, such as a bolt shaft, to enable tightening both the flanges together.

The mounting bracket is preferably formed of heat-tolerant material, which will endure in the environment of an automotive engine compartment, such as for example, metal such as aluminum alloys or stainless steel.

One example of a method of mounting the wastegate actuator on a turbocharger using the mounting bracket of the present invention include steps of: placing the wastegate actuator cylinder in the opening formed in the flat metal bracket; placing the two semi-circular halves of the clamping portion around the inlet pipe of the turbocharger; placing the wastegate actuator into a desired position by pivotally moving the clamping portion around the turbocharger inlet pipe; and fastening the clamping portion in place on the inlet pipe of the turbocharger by tightening a fastener such as a nut and a bolt, where part of the bolt extends through the flanges of the clamping portion.

It is an object of the present invention to provide a wastegate actuator mounting bracket that is relatively easy to mount on the turbocharger, simple to manufacture, and is of durable construction.

It is also an object of the present invention to provide a wastegate actuator mounting bracket that is easy to inspect, simple to install and quick to replace thereby minimizing time needed for repair work including mounting of a wastegate actuator.

It is a further object of the present invention to provide a stand-alone wastegate actuator mounting bracket which does not require additional structural features, such as a bolt pattern or studs, either on the turbocharger or on the wastegate actuator for mounting the wastegate actuator on to the turbocharger.

It is yet a further object of the present invention to provide a wastegate actuator mounting bracket that permits mounting of wastegate actuator on turbochargers having different dimensions.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

It should be understood that only structures considered necessary for clarifying the present invention are described herein. Other conventional structures, and those of ancillary and auxiliary components of the system, are assumed to be known and understood by those skilled in the art.

Figure 1:
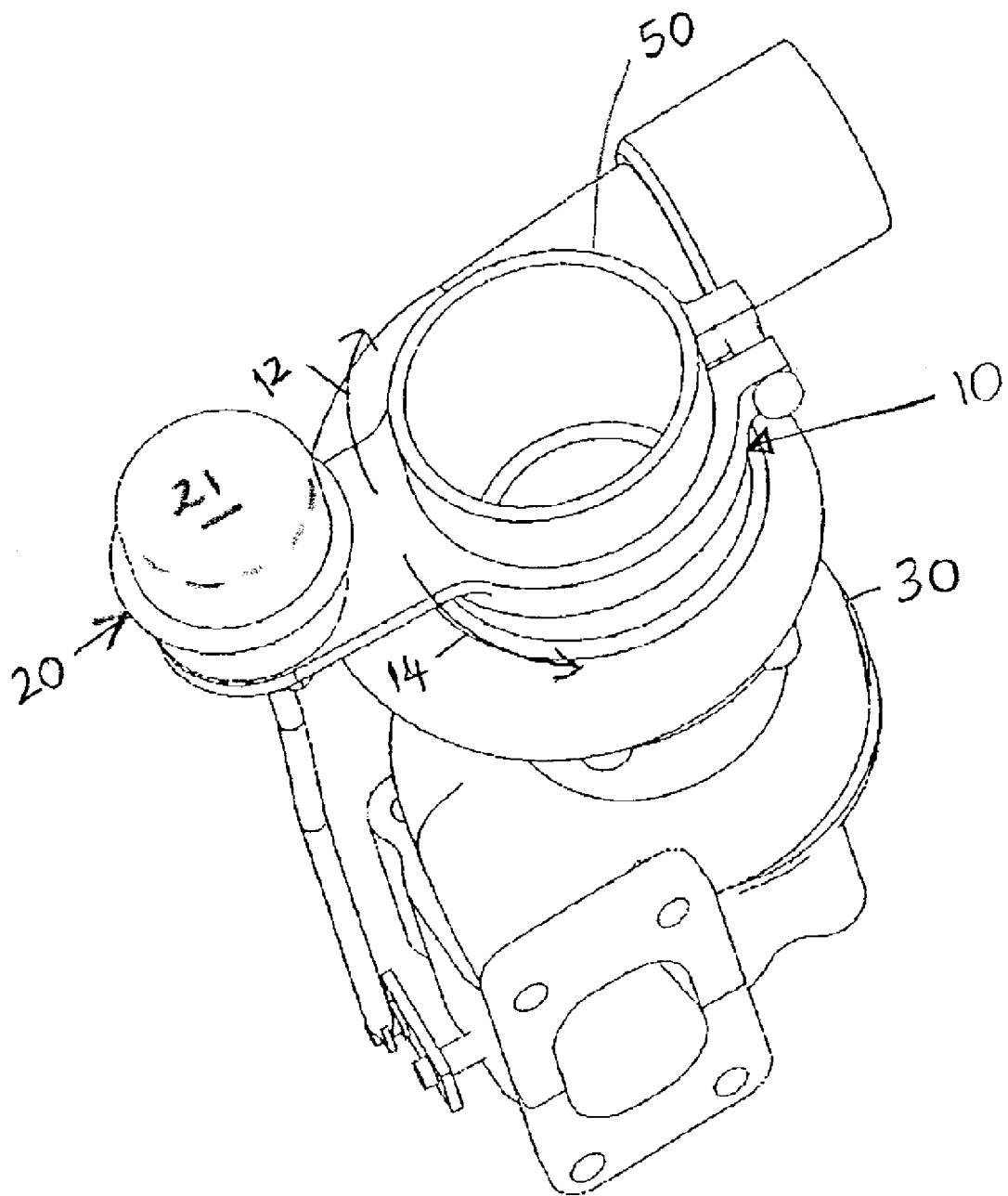
FIG. 1 is a perspective view of a turbocharger assembly incorporating a wastegate actuator mounting bracket apparatus in accordance with a selected illustrative embodiment of the present invention.

Referring now to the drawings, and in particular to FIG. 1 thereof, a selected illustrative embodiment of a wastegate actuator mounting bracket apparatus according to the present invention is designated generally by the reference numeral 10.

Figure 2:
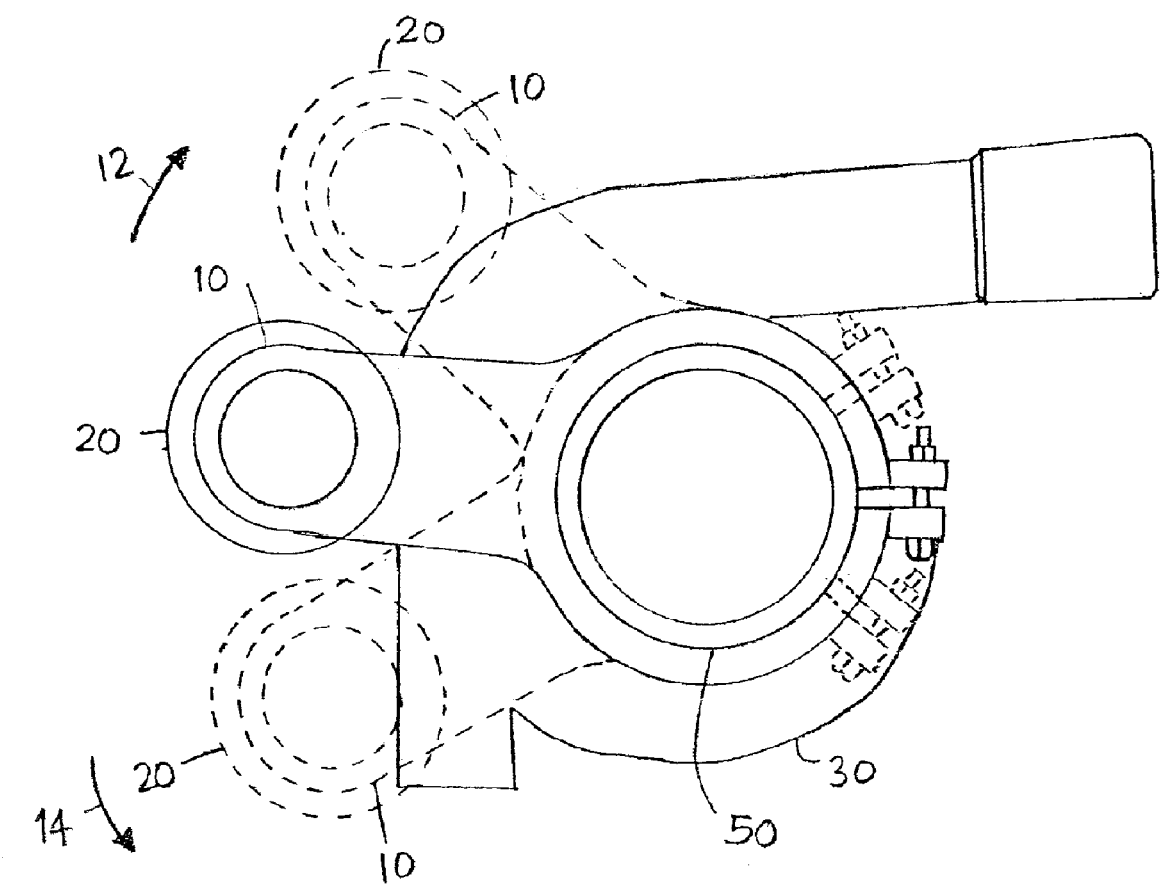
FIG. 2 is a side plan view of the wastegate actuator mounted on the turbocharger using the clamping bracket apparatus hereof, also showing two alternate positions of the actuator and bracket in phantom.

The wastegate actuator mounting bracket apparatus 10 of the present invention is adapted for use in installing a wastegate actuator 20 on a turbocharger 30 used in automotive vehicles, as shown in FIGS. 1 and 2. The versatile design of the wastegate actuator mounting bracket 10 permits a greater variety of positioning possibilities for installing the wastegate actuator 20 on the turbocharger 30 than were previously available. As shown by the alternate positions illustrated in phantom in FIG. 2, the bracket apparatus 10 and attached wastegate actuator 20 are adjustably movable around the inlet port in the directions indicated by arrows 12 and 14.

Figure 3:
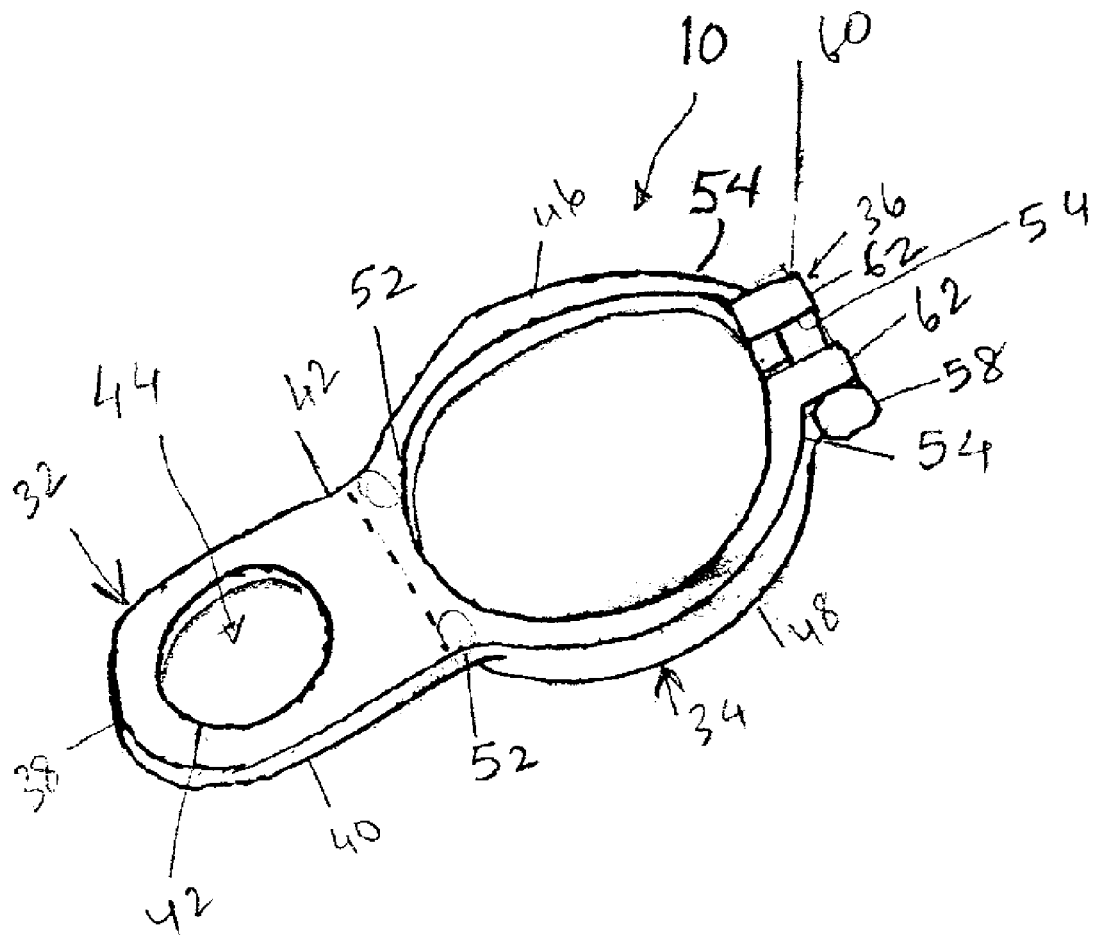
FIG. 3 is a perspective view of the wastegate actuator mounting bracket apparatus.
Figure 4:
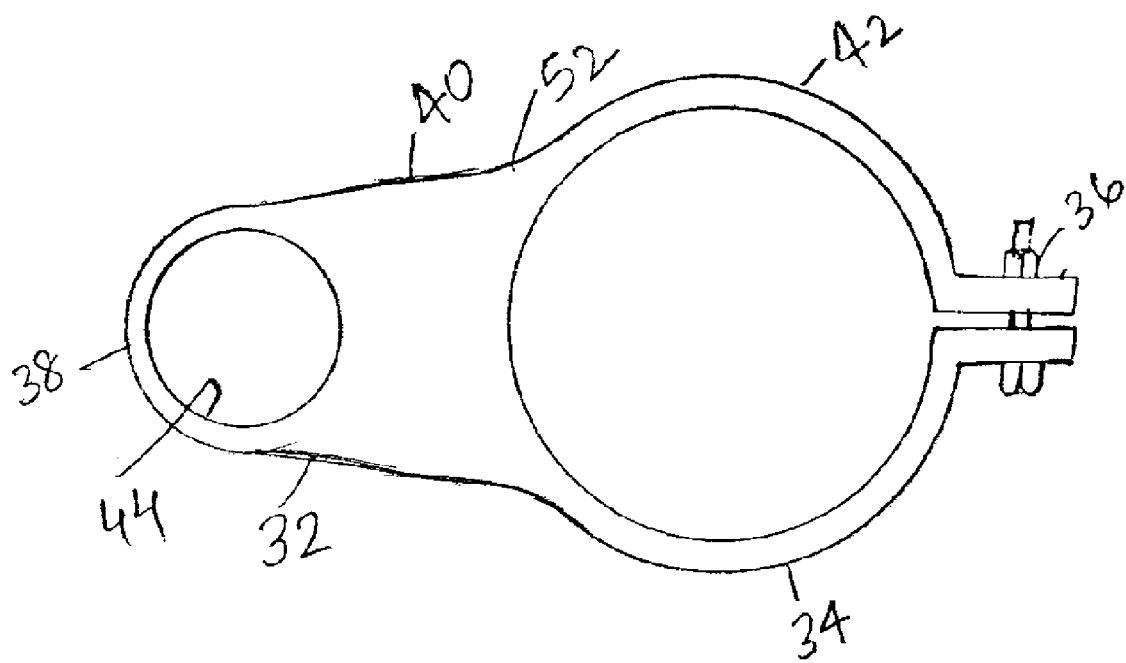
FIG. 4 is a side plan view of the wastegate actuator mounting bracket apparatus of FIG. 3.
Figure 5:
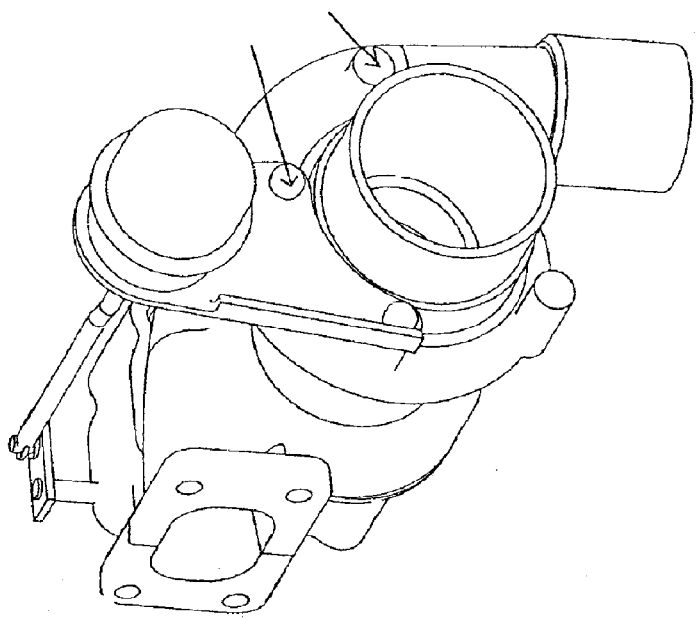
FIG. 5 is a lower side perspective view of a turbo charger assembly according to the prior art.
Figure 6:
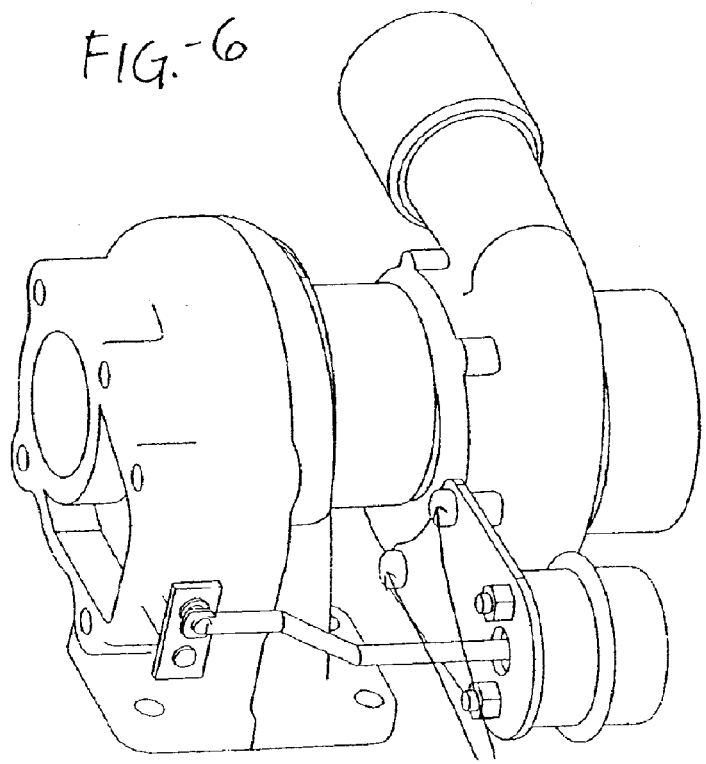
FIG. 6 is a side perspective view of turbo charger assembly according to the prior art.

Referring now to FIGS. 3 and 4, the wastegate actuator mounting bracket apparatus 10 according to the illustrative embodiment of FIGS. 1-4 includes a substantially flat metal bracket plate 32 having a circular opening 44 formed therein for receiving the canister 21 of the wastegate actuator 20. The wastegate actuator mounting bracket apparatus 10 also includes a clamping portion 34 integrally attached to the metal bracket plate 32 for fastening the mounting bracket to the turbocharger 30, and a fastener 36, attached to the clamping portion 34 for tightening it in place on the turbocharger 30.

The flat metal bracket plate 32 includes a first end portion 38, a central portion 40 and a second end portion 42. The flat metal bracket plate 32 has a circular opening 44 formed therein for receiving and supporting the cylindrical canister 21 of the wastegate actuator 20. When the wastegate actuator 20 is placed in the opening 44, the flat metal bracket plate 32 substantially surrounds and encircles the outer periphery of the wastegate actuator canister 21. The thickness of the metal bracket plate 32 is selected to effectively support the wastegate actuator, taking the lateral dimensions and weight of the wastegate actuator 20 into consideration.

In one embodiment, the circular opening 44 is formed and dimensioned in the bracket plate 32 in such a manner that no additional hardware or connector is generally required to secure the wastegate actuator 20 to the bracket plate. The opening 44 formed in the metal bracket plate may be of any desired shape, depending on the shape of the wastegate actuator, but will normally be circular in shape, because the known wastegate actuators tend to include a cylindrical canister.

In another variation on the depicted embodiment, either or both the wastegate actuator and the mounting bracket may include supplemental attachment hardware, for example, nuts and bolts, for securing the wastegate actuator to the mounting bracket.

The clamping portion 34 includes a pair of first and second semi-circular halves 46 and 48, which are substantially mirror images of one another, as shown. Each of the halves further includes a proximal end portion 52 and a distal end portion 54. The proximal end portion 52 of each of the halves 46, 48 is integrally attached to the second end portion 42 of the flat metal bracket plate 32. The distal end portion 54 of each half 46, 48 includes a flange for use in fastening the clamping portion 34 to the turbocharger. When mounted on the turbocharger, the clamping portion 34 substantially encircles the outer peripheral surface of the cylindrical fresh air inlet portion 50 of the turbocharger 30.

As discussed above, the fastener 36 of the clamping portion generally includes a pair of flanges 62, each flange attached to one of the distal end portions 54 of the semi-circular halves 46 and 48 of clamping portion. Each flange has a hole formed therein. Both the flanges are placed together and a fastener, such as a bolt, is placed in the aligned holes of the flanges to fasten the flanges together. A variety of fasteners, having appropriate dimensions and strength, may be used with the present invention to tighten the clamping portion 34 around the periphery of the fresh air inlet portion 50.

As noted above, the mounting bracket 10, for mounting of a wastegate actuator on a turbocharger, permits a large number of positioning possibilities of the wastegate actuator 20 on the turbocharger 30.

One example of a method of installing and positioning of the wastegate actuator 20 on a turbocharger using the mounting bracket 10 includes the steps of:

placing the wastegate actuator 20 in the circular opening 44 formed in the flat metal bracket plate 32 so that the canister 21 of the actuator 20 rests in the bracket plate;

placing the semi-circular halves 46, 48 of the clamping portion 34 around the inlet pipe 50 of the turbocharger 30;

achieving a desired position of the wastegate actuator 20 by rotating the clamping portion 34 around the inlet pipe 50; and closing the clamping portion by tightening the fastener extending through the flanges 62 to draw the halves 46, 48 together to fix the position of the bracket apparatus 10 on the turbocharger.

It is important to achieve a good mounting position of wastegate actuator on the turbocharger.

Although the present invention has been described herein with respect to specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A method of installing a wastegate actuator on a turbocharger using a mounting bracket, said mounting bracket comprising a bracket plate and a clamping portion integrally attached to the bracket plate, said method comprising the steps of:

placing a canister of the wastegate actuator into an opening formed in the bracket plate of the mounting bracket such that the opening substantially surrounds and encircles an outer periphery of the canister of the wastegate actuator;

placing the clamping portion of the mounting bracket around an inlet pipe of the turbocharger;

moving the mounting bracket on the turbocharger inlet to select a position of the wastegate actuator; and fastening the clamping portion in place on the turbocharger inlet pipe.

2. A method of installing a wastegate actuator on a turbocharger according to claim 1, wherein said step of moving the mounting bracket includes pivotally moving the clamping portion around the inlet pipe of the turbocharger.

3. A method of installing a wastegate actuator on a turbocharger according to claim 1, wherein said step of fastening the clamping portion includes tightening a nut and a bolt through flanges of the clamping portion.

4. A mounting bracket apparatus for mounting a wastegate actuator on a turbocharger, the mounting bracket apparatus comprising:

a substantially flat bracket plate having a circular opening formed therein for supporting a canister of a wastegate actuator; and a clamping portion integrally attached to the bracket plate for attaching the mounting bracket to the turbocharger, wherein said clamping portion includes a pair of halves which cooperate to substantially encircle and receive an inlet portion of the turbocharger therein and wherein an end portion of each of said halves is integrally attached to the bracket plate; and wherein said mounting bracket apparatus is a unitary structure.

5. A mounting bracket apparatus for mounting a wastegate actuator on a turbocharger, the mounting bracket apparatus comprising:

a bracket plate having an opening formed therein for supporting a wastegate actuator; and a clamping portion operatively and integrally attached to the bracket plate for attaching the mounting bracket to the turbocharger, wherein the clamping portion has a substantially circular opening formed therein to receive a cylindrical inlet portion of the turbocharger therein; and wherein said opening substantially surrounds and encircles an outer periphery of a canister of the wastegate actuator.

6. A mounting bracket apparatus for mounting a wastegate actuator on a turbocharger, the mounting bracket apparatus comprising:
   a bracket plate having an opening formed therein for supporting a wastegate actuator; and
   a clamping portion operatively and integrally attached to the bracket plate for attaching the mounting bracket to the turbocharger,
   wherein the clamping portion has a substantially circular opening formed therein to receive a cylindrical inlet portion of the turbocharger therein;
   wherein said clamping portion includes a pair of halves which cooperate to substantially encircle the inlet portion of the turbocharger; and
   wherein an end portion of each of said halves is integrally attached to the bracket plate.

7. An apparatus of claim 6, wherein the opening formed in the bracket plate is substantially circular in shape.

8. An apparatus of claim 6, wherein said bracket plate is substantially flat.

9. An apparatus of claim 6, wherein said bracket plate and said clamping portion are formed of metal.

10. An apparatus of claim 6, wherein said opening is operable to support a canister of the wastegate actuator.

11. An apparatus of claim 6, wherein said bracket plate and said clamping portion are formed of heat-tolerant material.

12. An apparatus of claim 6, wherein said opening is dimensioned such that no additional hardware is required to secure the wastegate actuator to the bracket plate.

13. An apparatus of claim 6, wherein one end of each of said halves of the clamping portion is integrally attached to the bracket plate and the other end of each of the halves includes a flange provided thereon, and said flange includes an opening formed therein to receive a fastener.

14. A turbocharger comprising the mounting bracket apparatus for mounting a wastegate actuator on the turbocharger, said mounting bracket apparatus comprising:
   a bracket plate having an opening formed therein for supporting the wastegate actuator; and
   a clamping portion operatively and integrally attached to the bracket plate for attaching the mounting bracket to the turbocharger,
   wherein the clamping portion has a substantially circular opening formed therein to receive a cylindrical inlet portion of the turbocharger therein;
   wherein said clamping portion includes a pair of halves which cooperate to substantially encircle the inlet portion of the turbocharger; and
   wherein an end portion of each of said halves is integrally attached to the bracket plate.

* * * * *